United States Patent

Koike et al.

[11] Patent Number: 6,127,517
[45] Date of Patent: Oct. 3, 2000

[54] POLYMERIZATION OF HEXAFLUOROPROPENE OXIDE

[75] Inventors: Noriyuki Koike, Usui-gun; Shinichi Sato, Usi-gun; Nobuyuki Kobayashi, Usui-gun, all of Japan

[73] Assignee: Shin-Etsu Chemical Co., Ltd., Tokyo, Japan

[21] Appl. No.: 09/285,007

[22] Filed: Apr. 1, 1999

[30] Foreign Application Priority Data

Apr. 1, 1998 [JP] Japan .................................. 10-105854

[51] Int. Cl.[7] .................................................. C08G 65/22
[52] U.S. Cl. ........................ 528/402; 528/401; 528/488; 528/491; 560/180; 560/184
[58] Field of Search .................... 528/402, 401, 528/488, 491; 560/180, 184

[56] References Cited

U.S. PATENT DOCUMENTS

| 3,660,315 | 5/1972 | Hill et al. . |
| 4,356,291 | 10/1982 | Darling . |
| 5,919,973 | 7/1999 | Matsuda et al. .......................... 560/184 |

FOREIGN PATENT DOCUMENTS

| 53-5360 | 2/1978 | Japan . |
| 57-175185 | 10/1982 | Japan . |
| 7-149889 | 6/1995 | Japan . |
| 7-165832 | 6/1995 | Japan . |
| 9-286853 | 11/1997 | Japan . |
| 10-147639 | 6/1998 | Japan . |
| 10-158387 | 6/1998 | Japan . |

OTHER PUBLICATIONS

Hill, James T., *J. Macromol. Sci.–Chem.*, A8(3), pp. 499–520 (1974).
Patent Abstracts of Japan, 07149889.
Patent Abstracts of Japan, 07165832.
Patent Abstracts of Japan, 09286853.
Patent Abstracts of Japan, 10147639.

*Primary Examiner*—Duc Truong
*Attorney, Agent, or Firm*—Millen, White, Zelano & Branigan, P.C.

[57] ABSTRACT

Before hexafluoropropene oxide (HFPO) is polymerized in a polymerization initiator solution of a polymerization initiator of the formula: $CSOCF_2-Rf-CF_2OCs$ wherein Rf is a perfluoroalkylene group which may have an ether bond in an aprotic polar solvent, the initiator solution is treated by adding a perfluoroolefin thereto at a sufficient temperature for the removal of protonic substances, cesium fluoride and hydrogen fluoride. This simple treatment restrains chain transfer reaction, and the process is successful in producing a difunctional HFPO polymer having a high degree of polymerization while suppressing formation of a monofunctional HFPO polymer.

10 Claims, No Drawings

POLYMERIZATION OF HEXAFLUOROPROPENE OXIDE

BACKGROUND OF THE INVENTION

1. Field of the Invention

This invention relates to a process for the polymerization of hexafluoropropene oxide (to be abbreviated as HFPO, hereinafter) and more particularly, to a process for the polymerization of HFPO for producing a difunctional HFPO polymer having a high degree of polymerization.

2. Prior Art

Several processes are known in the art for the polymerization of HFPO. For example, U.S. Pat. No. 3,250,807 discloses that difunctional HFPO polymers are prepared by reacting HFPO with FOC—(CF$_2$)$_n$—COF wherein n is from 0 to 6, in an aprotic polar solvent in the presence of a catalyst such as an alkali metal fluoride (represented by MF) or activated carbon according to the following reaction scheme.

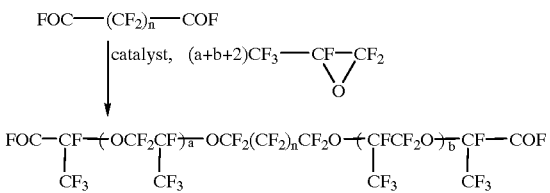

Such an attempt to add HFPO to the previously furnished polymerization initiator (FOC—(CF$_2$)$_n$—COF in the above process) often gives rise to the problem that a HFPO homopolymer is formed as a by-product due to chain transfer reaction as shown below.

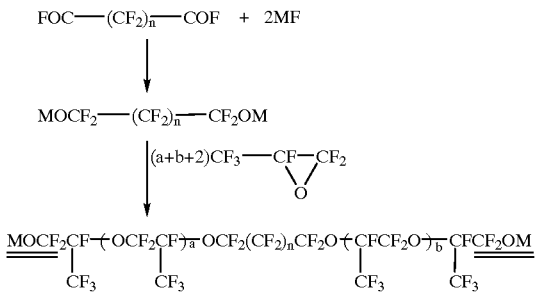

polymerization activating terminal
Separation of MF from polymerization activating terminal

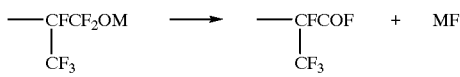

Ring opening (or chain transfer) of HFPO by MF

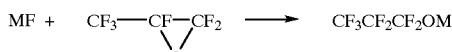

Formation of HFPO homopolymer

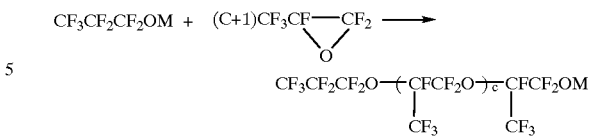

One solution to the above problem is disclosed in JP-B 5360/1978 and USP 3,660,315. According to this process, a difunctional polymer of formula (2a) is obtained using a tetraglyme solution of a compound of formula (1a) as the polymerization initiator.

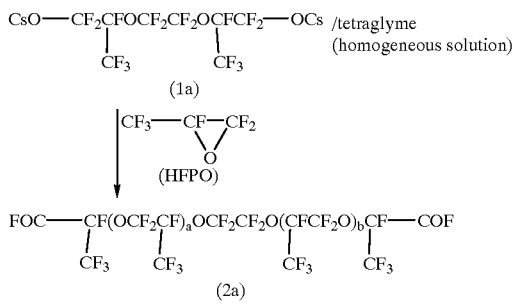

This process is characterized by mixing cesium fluoride with FOCCF(CF$_3$)OCF$_2$CF$_2$OCF(CF$_3$)COF in tetraglyme, and separating the excess of cesium fluoride from the solution to give a homogeneous solution, and effecting polymerization of HFPO in the homogeneous solution. This prevents the homo-polymerization of HFPO which is caused by the excess of cesium fluoride, and therefore, suppresses the formation of a monofunctional (or one-end functional) HFPO polymer.

U.S. Pat. No. 4,356,291 describes that high molecular weight HFPO polymers are obtainable using highly purified HFPO because HFPO generally contains impurities such as hydrogen fluoride, acid fluorides and water which undesirably restrict the maximum degree of polymerization of polymers resulting from polymerization of HFPO. Also, J. Macromol. Sci. Chem., A8 (3), 499–520 (1974) describes that the presence of hexafluoropropene (to be abbreviated as HFP, hereinafter) during HFPO polymerization is effective for preventing chain transfer reaction and therefore, increasing the degree of polymerization of the resulting polymer. The alleged effect of HFP is to trap free cesium fluoride.

It is also known that the addition of water or alcohols to the HFPO polymerization system promotes chain transfer reaction so that only oligomers having a low degree of polymerization are produced. These protonic compounds form hydrofluoric acid with active terminals available in the HFPO polymerization system in accordance with the reaction scheme shown below, and hydrofluoric acid functions as a chain transfer agent.

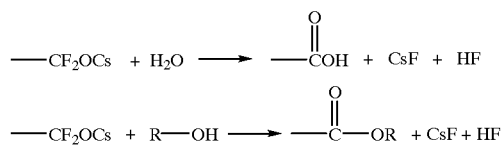

-continued

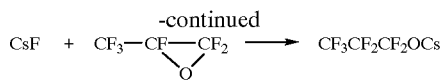

Therefore, in the prior art, the method of preventing chain transfer reaction during HFPO polymerization for increasing the degree of polymerization of HFPO polymers has been investigated from the aspect of removing free cesium fluoride in the HFPO polymerization system and the chain transfer reaction-inducing substances in the HFPO reactant.

The known polymerization initiator for use in HFPO polymerization is generally prepared by mixing and agitating a perfluorodicarboxylic acid fluoride represented by the formula (3):

$$\text{FOC—Rf—COF} \quad (3)$$

wherein Rf is a perfluoroalkylene group of 1 to 4 carbon atoms or perfluoroalkylene group of 2 to 10 carbon atoms having an ether bond, with cesium fluoride in an aprotic polar solvent, followed by precipitation and separation of the excess of cesium fluoride. One reactant, perfluorodicarboxylic acid fluoride is highly hydrolyzable while the other reactant, cesium fluoride is highly hygroscopic. Therefore, the series of steps must be carried out through a vacuum line or in a glove box, which operation is cumbersome. Even the carefully prepared solution has a possibility of containing water, hydrogen fluoride and other impurities that can induce chain transfer reaction.

Accordingly, there is a desire to have a process for producing a HFPO polymer that can minimize the above-mentioned possibility and ensures to simply prevent chain transfer reaction.

SUMMARY OF THE INVENTION

An object of the invention is to provide a process for producing a difunctional HFPO polymer having a high degree of polymerization while preventing chain transfer reaction in a simple manner, so that the resulting product contains little or substantially no monofunctional HFPO polymer.

According to the invention, there is provided a process for polymerizing hexafluoropropene oxide (HFPO). There is furnished a polymerization initiator solution which contains in an aprotic polar solvent a polymerization initiator represented by the following general formula (1):

$$\text{CsOCF}_2\text{—Rf—CF}_2\text{OCs} \quad (1)$$

wherein Rf is a perfluoroalkylene group of 1 to 4 carbon atoms or perfluoroalkylene group of 2 to 10 carbon atoms having an ether bond. The polymerization initiator solution is treated by adding a perfluoroolefin thereto at a temperature of −30° C. to 50° C. After this treatment, HFPO is fed to the polymerization initiator solution for effecting polymerization of HFPO.

More particularly, before polymerization of HFPO is effected in a polymerization initiator solution containing a polymerization initiator of formula (1) in an aprotic polar solvent, a perfluoroolefin is added to the polymerization initiator solution for effecting catalytic reaction, that is, at a temperature of −30° C. to 50° C. Then, protonic substances contained in minor amounts in the polymerization initiator solution and cesium fluoride and hydrogen fluoride formed therefrom in the solution can be captured and removed. When polymerization of HFPO is effected in the thus prepared polymerization initiator solution, chain transfer is substantially prohibited, ensuring the formation of a difunctional HFPO polymer. The reaction of perfluoroolefin can be carried out within the polymerization reactor, which can be directly followed by the polymerization of HFPO without a need for intermediate separating operation. The undesirable chain transfer reaction can be prohibited in a simple manner without a need for special apparatus such as a vacuum line.

DETAILED DESCRIPTION OF THE INVENTION

The process for polymerizing HFPO according to the present invention is to polymerize HFPO in a polymerization initiator solution which contains a compound represented by the following general formula (1):

$$\text{CsOCF}_2\text{—Rf—CF}_2\text{OCs} \quad (1)$$

wherein Rf is a perfluoroalkylene group of 1 to 4 carbon atoms or perfluoroalkylene group of 2 to 10 carbon atoms having an ether bond as the polymerization initiator in an aprotic polar solvent.

The polymerization initiator solution can be prepared by known methods as described in U.S. Pat. No. 3,660,315. More particularly, it may be prepared by mixing and agitating a perfluorodicarboxylic acid fluoride represented by the following general formula (3):

$$\text{FOC—Rf—COF} \quad (3)$$

wherein Rf is as defined above, cesium fluoride, and an aprotic polar solvent, causing the excess of cesium fluoride to precipitate, and separating the supernatant.

Rf represents perfluoroalkylene groups of 1 to 4 carbon atoms, preferably 2, 3 or 4 carbon atoms or ether bond-bearing perfluoroalkylene groups of 2 to 10 carbon atoms, preferably 4 to 8 carbon atoms. Their examples are given below.

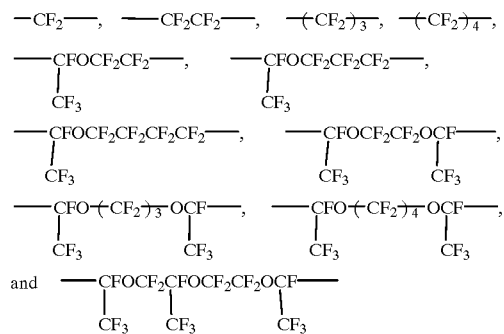

The perfluorodicarboxylic acid fluorides of formula (3) are typically those of 3 to 12 carbon atoms, preferably 6 to 10 carbon atoms. Their examples are shown below.

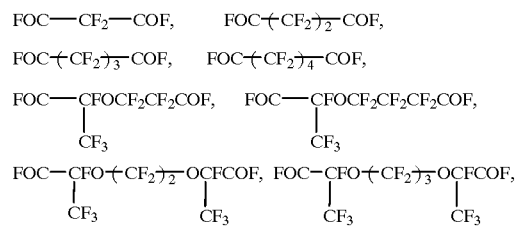

-continued

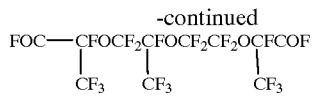

Of these compounds, the following is most preferable.

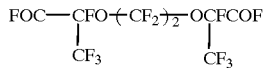

Cesium fluoride is commercially available, typically in fine powder form. It may be dried before use.

The aprotic polar solvents which can be used herein include glymes such as monoglyme, diglyme, triglyme, and tetraglyme, tetrahydrofuran, and 1,4-dioxane. Preferred are glymes, especially tetraglyme. If the aprotic polar solvent used has a freezing point of higher than $-40°$ C., the solution would become less flowing at the polymerization temperature. In such a case, another solvent having a lower freezing point may be added.

In the practice of the invention, it is preferred to use as the aprotic polar solvent for the polymerization initiator solution, a mixture of (1) a first solvent in the form of a chain or cyclic hydrocarbon compound having at least 4, especially at least 5 ether bonds in a molecule, for example, tetraglyme or crown ether and (2) a second solvent in the form of an aprotic polar solvent having a melting point of not higher than $-40°$ C., especially not higher than $-50°$ C. under atmospheric pressure, typically a hydrocarbon compound having 1 to 3 ether bonds in a molecule, for example, dimethyl ether, diethyl ether, ethyl methyl ether, methyl propyl ether, ethylene glycol dimethyl ether or tetrahydrofuran. The second solvent is preferably mixed in an amount of about 3 to 60% by weight, especially about 20 to 60% by weight of the polymerization initiator solution. If the amount of the second solvent is excessive, a more amount of by-product (monofunctional polymer) can form.

It is necessary to dry these solvents before use. For the present invention, the solvents are dried to a water content of less than about 100 ppm, especially less than about 50 ppm.

In the polymerization initiator solution, the compound of formula (1) is preferably present at a concentration of $2.0 \times 10^{-4}$ to $9.0 \times 10^{-4}$ mol/g, more preferably $2.5 \times 10^{-4}$ to $7.0 \times 10^{-4}$ mol/g.

According to the invention, a perfluoroolefin is added to the polymerization initiator solution at a temperature of $-30°$ C. to $50°$ C. Preferably, reaction of trapping protonic substances in the solution and/or cesium fluoride and hydrogen fluoride by-products formed therefrom is effected at a temperature above the HFPO polymerization temperature (to be described later). This reaction may be effected in the same reactor as used for the subsequent polymerization of HFPO. That is, after the completion of trapping reaction, polymerization of HFPO may be successively carried out in the same reactor.

The perfluoroolefins used herein are those of 2 to 9 carbon atoms, especially 3 to 6 carbon atoms, with exemplary perfluoroolefins being shown below.

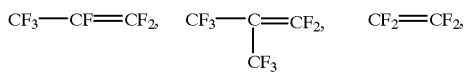

-continued

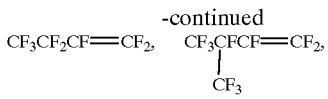

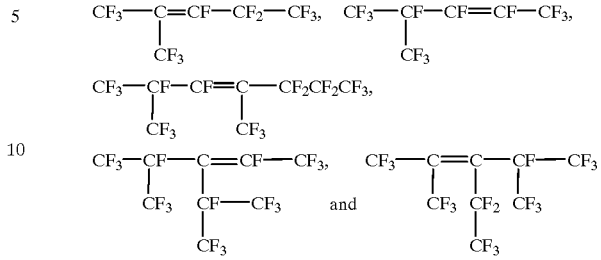

Of these perfluoroolefins, the following are especially preferred.

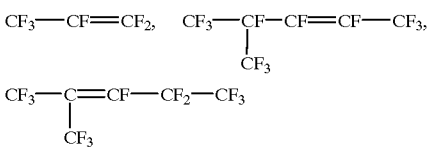

The amount of perfluoroolefin used is not critical although the perfluoroolefin is typically used in an amount of about 0.5 to 100 parts, especially about 3 to 30 parts by weight per 100 parts by weight of the polymerization initiator solution.

When the perfluoroolefin is added for reaction, the temperature is typically $-30°$ C. to $50°$ C., preferably $-25°$ C. to $30°$ C. Reaction requires a longer time at too lower temperatures whereas the initiator can be decomposed at too higher temperatures. The reaction time is not critical. At reaction temperatures of $-25°$ C. to $30°$ C., the reaction time including the time required for the addition of perfluoroolefin usually ranges from about 10 minutes to about 2 hours, preferably from about 20 minutes to about 1 hour.

In the next step, HFPO is added to the thus treated polymerization initiator solution whereupon polymerization of HFPO is effected at conventional temperatures. At this point, hexafluoropropene (HFP) may be added at the same time as the addition of HFPO.

The amount of HFPO fed may be determined as appropriate and may broadly range from about 10 to 400 mol, usually about 30 to 300 mol, per mol of the polymerization initiator. HFPO may be fed in either gas or liquid form. In order to maintain the internal temperature constant, a continuous supply of HFPO is preferred. HFPO may be fed for about 3 to 120 hours. The supply of HFPO is preferably carried out in a continuous manner using a flow rate regulator such as a mass flow controller. HFPO supply at a constant rate is necessary for maintaining the temperature of the reaction solution within an appropriate range. An appropriate hourly feed rate of HFPO is about 3 to 15 mol, preferably about 5 to 10 mol per mol of the polymerization initiator.

The reaction temperature is preferably from $-45°$ C. to $-30°$ C. After the completion of polymerization, the reaction solution is ripened for about ½ to 24 hours with the internal temperature maintained at $-45°$ C. to $-30°$ C. Thereafter, the temperature is raised to about $20°$ C. whereupon the contents are recovered and the polymer is separated. There is obtained the difunctional HFPO polymer of the following general formula (2) in a form containing little or substantially no monofunctional HFPO polymer.

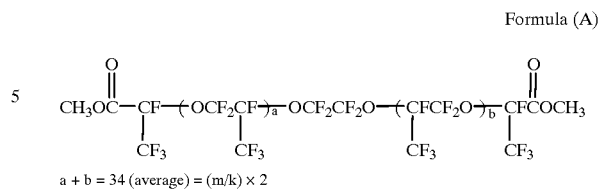

(2)

Rf is as defined above, and the sum of a and b is an integer of 10 to 400, especially 30 to 300.

There has been described a process for producing a difunctional HFPO polymer having a high degree of polymerization. The process uses a simple step for preventing chain transfer reaction and suppresses the formation of monofunctional HFPO polymer.

EXAMPLE

Examples of the invention are given below by way of illustration and not by way of limitation.

Example 1

A 500-ml four-necked flask equipped with a thermometer, stirrer, and condenser was charged with 49.2 g of a tetraglyme solution containing $5.0 \times 10^{-4}$ mol/g of $CsOCF_2CF(CF_3)OCF_2CF_2OCF(CF_3)CF_2OCs$. With the condenser set at $-45°$ C., 11.0 g of hexafluoropropene (HFP) was fed over 30 minutes while stirring the contents. In this step, the internal temperature was 21 to 23° C. As the reaction proceeded, the phenomenon that the contents gradually became white turbid was observed.

Next, the flask was cooled with a coolant bath so as to adjust the internal temperature to $-35°$ C. HFP, 18.2 g, was fed over 43 minutes, and 127 g of HFPO and 43.8 g of HFP were fed over 23 hours. In this step, the internal temperature was in the range of $-38°$ C. to $-32°$ C. After the completion of addition, agitation was continued for 12 hours at a temperature of $-38°$ C. to $-32°$ C. With the coolant bath removed, the internal temperature rose to about 20° C., during which period the unreacted HFP was gasified and purged. The content in the flask was a white turbid viscous liquid and the yield was 184.6 g.

To the product thus recovered were added 50 g of methanol and 70 g of 1,3-bistrifluoromethylbenzene. The mixture was agitated for 30 minutes at 20 to 23° C., combined with 50 g of methanol, and allowed to stand for phase separation whereupon the lower layer was taken out. After the volatiles were stripped off at 120° C. and 1 mmHg, the residue was filtered, obtaining 132 g of a colorless clear viscous liquid (methyl ester of difunctional HFPO polymer) represented by the following formula (A). It was analyzed by $^{19}$F-NMR, with the results shown below.

$^{19}$F-NMR

δ(ppm) $CF_3COOH$ standard, integration ratio

| -54 | k = 1.0 | O‖CF—C— |
|---|---|---|
| -67 | m = 17.2 | $OCF—CF_2$ |
| -2~-5 | n = 92.0 | $CF_3$, $O—CF_2—$ |

No peak attributable to $CF_3—CF_2—CF_2$ of the terminal group $CF_3CF_2CF_2O—$ of the single ended oligomer was detected.

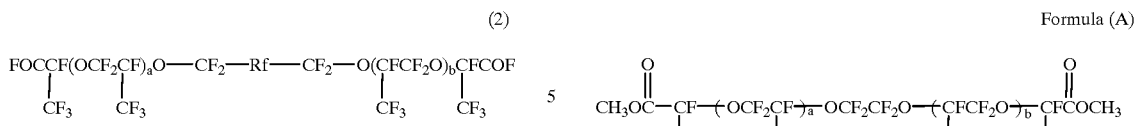

Formula (A)

a + b = 34 (average) = (m/k) × 2

Example 2

A 30-liter stainless steel autoclave was charged with 2.14 kg of a tetraglyme solution containing $5.0 \times 10^{-4}$ mol/g of $CsOCF_2CF(CF_3)OCF_2CF_2OCF(CF_3)CF_2OCs$. With stirring at an internal temperature of 3° C., 0.47 kg of HFP was fed over one hour. Thereafter, brine was circulated through the jacket for cooling the autoclave. At an internal temperature of $-24°$ C., 0.47 kg of HFP was fed over one hour again. Then at an internal temperature of $-34°$ C. to $-30°$ C., 5.85 kg of HFPO and 1.61 kg of HFP were concurrently fed over 72 hours. After the completion of addition, agitation was continued for 17 hours at $-34°$ C.

Next, brine was drained and instead, warm water was circulated for warming. At this point, a generation of heat due to oligomerization of HFP was observed. After the completion of reaction, 10.30 kg of a white turbid viscous product was recovered. A part of this product was methyl esterified as in Example 1 and analyzed to find that the product was a polymer of the following formula (B). The results of $^{19}$F-NMR are shown below.

$^{19}$F-NMR

δ(ppm) $CF_3COOH$ standard, integration ratio

| -54 | k = 1.00 | O‖CF—C— |
|---|---|---|
| -67 | m = 15.01 | $OCF—CF_2$ |
| -2~-5 | n = 78.10 | $CF_3$, $O—CF_2—$ |

No peak attributable to $CF_3CF_2CF_2O—$ was detected.

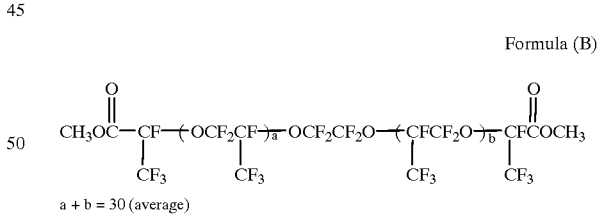

Formula (B)

a + b = 30 (average)

Example 3

The same reactor as used in Example 1 was charged with 49.7 g of a tetraglyme solution containing $5.0 \times 10^{-4}$ mol/g of $CsOCF_2CF(CF_3)OCF_2CF_2OCF(CF_3)CF_2OCs$, and 0.015 g of water was added thereto. This amount of water corresponds to about 300 ppm based on the tetraglyme solution. Then with stirring at an internal temperature of 20° C., 11.0 g of HFP was fed over 30 minutes. At an internal temperature of $-35°$ C., 16.4 g of HFP was further fed over 45 minutes. Next, at an internal temperature of $-35°$ C. to $-32°$ C., 130 g of HFPO and 42.6 g of HFP were fed over 24 hours. Thereafter, agitation was continued for 17 hours at −33° C. After warming up, the product was recovered in a yield of 214.6 g. This product was methyl esterified as in Example 1 and analyzed to find that the product was a polymer of the following formula (C). The results of $^{19}$F-NMR are shown below.

$^{19}$F-NMR

δ(ppm) CF$_3$COOH standard, integration ratio

| | | |
|---|---|---|
| −54 | k = 1.00 | O‖ C<u>F</u>—C— |
| −67 | m = 16.51 | OC<u>F</u>—CF$_2$ |
| −2~−5 | n = 89.41 | C<u>F</u>$_3$, O—C<u>F</u>$_2$— |

No peak attributable to CF$_3$CF$_2$CF$_2$O— was detected.

Formula (C)

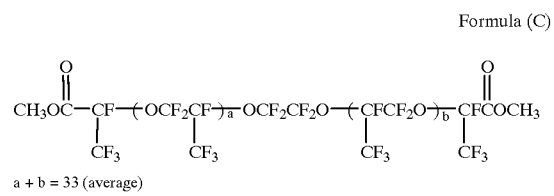

a + b = 33 (average)

Comparative Example 1

A 500-ml four-necked flask equipped with a thermometer, stirrer, and condenser was charged with 20.0 g of a tetraglyme solution containing 5.0×10$^{-4}$ mol/g of CSOCF$_2$CF(CF$_3$)OCF$_2$CF$_2$OCF(CF$_3$)CF$_2$OCs. With the condenser set at −45° C., the flask was cooled with a coolant bath while stirring the contents. At an internal temperature of −38° C., 9.8 g of HFP was fed over one hour, followed by 30 minutes of agitation. Next, 58.1 g of HFPO and 21.5 g of HFP were fed over 23 hours. In this step, the internal temperature was in the range of −38° C. to −37° C. Thereafter, agitation was continued for 17 hours at −40° C. until the reaction was completed. With the coolant bath removed, the internal temperature rose to about 20° C., during which period the unreacted HFP was gasified and purged. The content in the flask was a white turbid viscous liquid and the yield was 93.1 g. This product was methyl esterified as in Example 1 and analyzed to find that the product was a mixture of compounds of the following formulae (D) and (E). The $^{19}$F-NMR results of this polymer (mixture) are shown below.

$^{19}$F-NMR

δ(ppm) CF$_3$COOH standard, integration ratio

| | | |
|---|---|---|
| −54 | k = 1.10 | O‖ C<u>F</u>—C— |
| −67 | m = 12.50 | OC<u>F</u>—CF$_2$ |
| −2~−5 | n = 66.10 | C<u>F</u>$_3$, O—C<u>F</u>$_2$— |
| −52 | x = 0.55 | CF$_3$C<u>F</u>$_2$CF$_2$O— |

Polymer

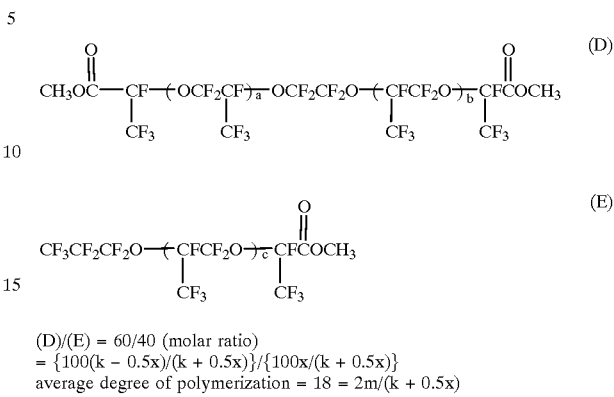

(D)/(E) = 60/40 (molar ratio)
= {100(k − 0.5x)/(k + 0.5x)}/{100x/(k + 0.5x)}
average degree of polymerization = 18 = 2m/(k + 0.5x)

Comparative Example 2

A 30-liter stainless steel autoclave was charged with 2.34 kg of a tetraglyme solution containing 5.0×10$^{-4}$ mol/g of CSOCF$_2$CF(CF$_3$)OCF$_2$CF$_2$OCF(CF$_3$)CF$_2$OCs. With stirring, the autoclave was cooled. At an internal temperature of −36° C. to −30° C., 6.86 kg of HFPO and 3.11 kg of HFP were concurrently fed over 72 hours. After the completion of addition, agitation was continued for 10 hours at −34° C. to −32° C.

Next, the reactor was warmed up as in Example 2, recovering 10.647 kg of a product. A part of this product was methyl esterified as in Example 1 and analyzed to find that the product was a mixture of compounds of the following formulae (F) and (G). The $^{19}$F-NMR results of this polymer (mixture) are shown below.

$^{19}$F-NMR

δ(ppm) CF$_3$COOH standard, integration ratio

| | | |
|---|---|---|
| −54 | k = 0.70 | O‖ C<u>F</u>—C— |
| −67 | m = 11.00 | OC<u>F</u>—CF$_2$ |
| −2~−5 | n = 57.30 | C<u>F</u>$_3$, O—C<u>F</u>$_2$— |
| −52 | x = 0.13 | CF$_3$C<u>F</u>$_2$CF$_2$O— |

Polymer

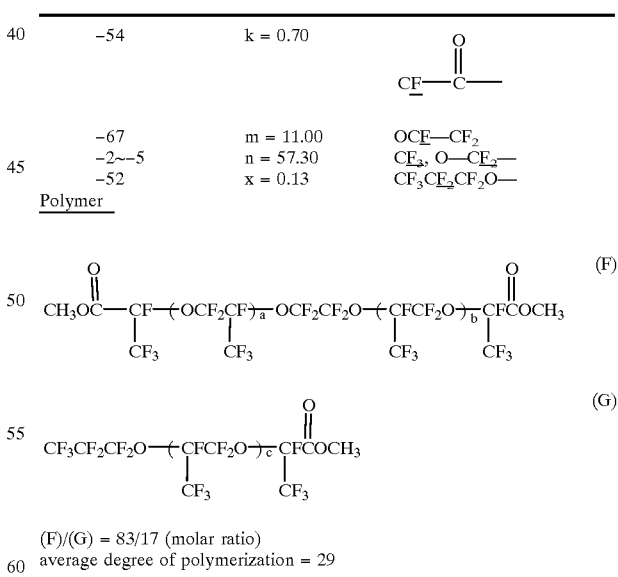

(F)/(G) = 83/17 (molar ratio)
average degree of polymerization = 29

Japanese Patent Application No. 105854/1998 is incorporated herein by reference.

Reasonable modifications and variations are possible from the foregoing disclosure without departing from either the spirit or scope of the present invention as defined by the claims.

What is claimed is:

1. A process for polymerizing hexafluoropropene oxide comprising the steps of:

preparing a polymerization initiator solution which contains in an aprotic polar solvent a polymerization initiator represented by the following general formula (1):

$$CsOCF_2-Rf-CF_2OCs \qquad (1)$$

wherein Rf is a perfluoroalkylene group of 1 to 4 carbon atoms or perfluoroalkylene group of 2 to 10 carbon atoms having an ether bond, treating said polymerization initiator solution by adding a perfluoroolefin thereto at a temperature of $-30°$ C. to $50°$ C. to remove protonic substances, cesium fluoride and hydrogen fluoride in said polymerization initiator, and feeding hexafluoropropene oxide to the treated polymerization initiator solution for effecting polymerization of hexafluoropropene oxide.

2. The process of claim 1 wherein the perfluoroalkylene group or ether bond-bearing perfluoroalkylene group represented by Rf is selected from the group consisting of:

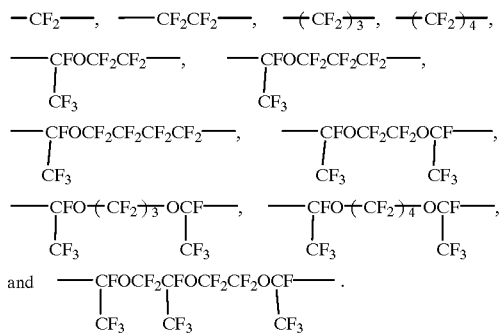

3. The process of claim 1 wherein said aprotic polar solvent comprises a member selected from the group consisting of monoglyme, diglyme, triglyme, tetraglyme, tetrahydrofuran, and 1,4-dioxane.

4. The process of claim 1 wherein said polymerization initiator of formula (1) is present in the polymerization initiator solution at a concentration of $2.0 \times 10^{-4}$ to $9.0 \times 10^{-4}$ mol/g.

5. The process of claim 1 wherein the perfluoroolefin has 2 to 9 carbon atoms.

6. The process of claim 1 wherein the perfluoroolefin is selected from the group consisting of:

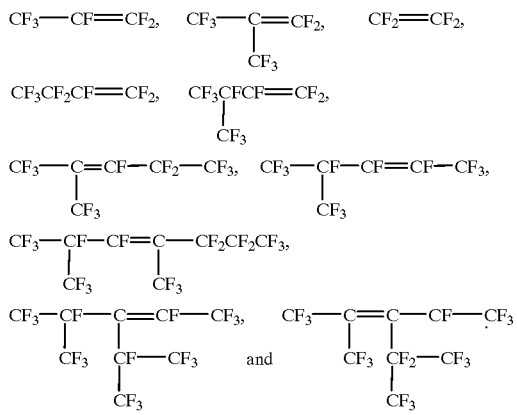

7. The process of claim 1 wherein the amount of perfluoroolefin added is about 5 to 100 parts by weight per 100 parts by weight of the polymerization initiator solution.

8. The process of claim 1 wherein the perfluoroolefin is added to said polymerization initiator solution at a temperature of $-25°$ C. to $30°$ C.

9. The process of claim 1 wherein the amount of hexafluoropropene oxide fed is about 10 to 400 mol per mol of the polymerization initiator.

10. The process of claim 1 wherein the polymerization of hexafluoropropene oxide yields a compound of the following formula (2):

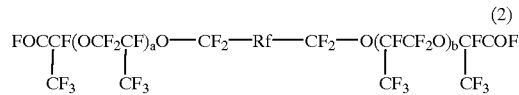

wherein Rf is as defined above, and the sum of a and b is an integer of 10 to 400.

* * * * *